United States Patent [19]

Willems et al.

[11] Patent Number: 4,676,375
[45] Date of Patent: Jun. 30, 1987

[54] STORAGE CONTAINER FOR FLAT ARTICLES WITH UNDERCUT HINGE PORTIONS

[75] Inventors: Martin Willems; Albert Feilen, both of Frankfurt; Otfried Urban, Wiesbaden, all of Fed. Rep. of Germany

[73] Assignee: BASF Aktiengesellschaft, Ludwigshafen, Fed. Rep. of Germany

[21] Appl. No.: 888,110

[22] Filed: Jul. 21, 1986

Related U.S. Application Data

[63] Continuation of Ser. No. 669,823, Nov. 9, 1984, abandoned.

[30] Foreign Application Priority Data

Nov. 10, 1983 [DE] Fed. Rep. of Germany ... 8332322[U]

[51] Int. Cl.⁴ ............................................. B65D 85/30
[52] U.S. Cl. .................................. 206/444; 206/45.13; 206/45.23; 220/337; 220/340
[58] Field of Search ...................... 206/387, 444, 45.23, 206/45.13; 220/337–342

[56] References Cited

U.S. PATENT DOCUMENTS

| | | | |
|---|---|---|---|
| 1,168,408 | 1/1916 | Marbach | 220/337 X |
| 1,711,327 | 4/1929 | Rock | 220/342 X |
| 2,685,983 | 8/1954 | Kelley | 220/331 X |
| 3,516,592 | 6/1970 | Friedrich | 220/72 X |
| 3,754,639 | 8/1973 | Gellert | 206/1 R |
| 3,909,088 | 9/1975 | Dennehey et al. | 206/387 X |
| 4,253,568 | 3/1981 | Long et al. | 206/387 |
| 4,356,918 | 11/1982 | Kahle et al. | 206/444 |
| 4,381,063 | 4/1983 | Leong | 220/342 X |
| 4,420,079 | 12/1983 | Gliniorz et al. | 206/387 |

FOREIGN PATENT DOCUMENTS 1430704 1/1966 France .
2091219 7/1982 United Kingdom .

Primary Examiner—William Price
Assistant Examiner—Bryon Gehman
Attorney, Agent, or Firm—Keil & Weinkauf

[57] ABSTRACT

A positive interlocking arrangement between two container parts connected pivotably by a joint essentially consists of circular edges in side walls of one part of the container and grooves which are provided in the circular edges and which are engaged by counter-pieces on the other container part which are in the form of sloping surfaces or steps. The container parts can be separated only in the region of a predetermined angle of rotation, in particular in the vicinity of the closed position of the container. Provisions for limiting rotation can advantageously be combined with the interlocking devices. The positive interlocking arrangement can be used for any container which consists of rectangular molded components essentially connected pivotably to one another.

12 Claims, 5 Drawing Figures

STORAGE CONTAINER FOR FLAT ARTICLES WITH UNDERCUT HINGE PORTIONS

This application is a continuation of application Ser. No. 669,823 filed Nov. 9, 1984, now abandoned.

The present invention relates to an essentially rectangular storage container for flat articles, in particular magnetic recording media in packages, which possesses a bottom part, consisting of a base wall bordered on two sides by side walls, and a lid part, consisting of a lid wall at least partly bordered at the sides by side walls, and a joint device between the bottom part and the lid part.

French Pat. No. 1,430,704 discloses a two-part cassette container which can be swung open and in which the lid part has a pocket for holding the cassette, and the bottom part has a cutout which corresponds to the front wall of the pocket and in which this front wall lies when the container is closed, so that a closed rectangular housing is formed. The lid part and bottom part are connected to one another via two pivot joints. The container is unsuitable as display packaging, the joints are primitive and cannot be subjected to any appreciable load, and the bottom and lid parts are easy to separate from one another and therefore may be lost.

According to German Published Application DAS No. 2,366,195, providing rotation-restricting projections on the lid part, which in the event of opening by 180° come into contact with the top edges of the sides of the bottom part, makes it more difficult for the cassette to fall out; in practice, however, this does not prevent the cassette from falling out. Such projections have no effect on the separation of the bottom part and the lid part, which takes place too readily.

German Laid-Open Application DOS No. 3,201,487 discloses a container for magnetic storage elements, in particular FlexyDisks ® which is manufactured as one piece, is in the form of a snap case and possesses a springy joint arrangement and a support device between the upper and lower parts of the container, so that the container can be used as a display container when open, and as a storage container when closed. The supporting and securing device consists of a simple stop on one of the side walls or a peg which moves in a guide groove in the base.

®registered trademark of BASF Aktiengesellschaft, Ludwigshafen/Rhein, FRG

It is an object of the present invention to interlock the parts of a two-part container so that it is virtually impossible for either of them to be lost, this being achieved in spite of the simple manufacture and assembly of the container parts.

We have found that this object is achieved by means of a circular edge, as a first interlocking part, which is provided on the outside of each of the side walls of the lid part or on the inside of each of the side walls of the bottom part, and possesses a groove, the side walls of the other part of the container partly or completely engaging the groove with a second interlocking part in order to effect positive interlocking dependent on the pivoting angle.

Consequently, the lid part and the bottom part can be assembled in a defined position with respect to each other and, if required, can be detached from one another in another position which can be determined. The combination of circular edge and groove permits interlocking of a part or all of the circular edge with the complementary second joint part.

It is advantageous in practice if the groove is formed by an undercut in the circular edge, so that manufacture can be carried out by the injection molding method, assembly is easy and good operating characteristics are achieved.

In a practical embodiment, the side walls of the bottom part can have semicircular ends. This is an adequate safety measure against unintentional separation, and permits the container parts to be manufactured in a simple manner.

In another advantageous embodiment, the 100° arc can be arranged on the container parts in such a way that the interlocking parts can be disengaged (exclusively) in or near the closed position of the container parts.

Particularly where the container is used as a display container, the side walls of the bottom part can be provided with slots which are parallel to and concentric with the beveled edge and about as wide as the circular edge. The maximum opening angle of the lid can be predetermined by the length of the slot.

It is advantageous in practice if the joint consists of a cylindrical projection on each side wall of the lid part, and of a corresponding circular opening in each side wall of the bottom part.

To facilitate assembly, the cylindrical projections and/or the ends of the side walls of the bottom part can be beveled so that the side walls of the bottom part can be pushed over.

In a material-saving embodiment of the container, the base wall can have a cutout which is bordered at the sides by the side walls of the bottom part, and the lid part can possess a pocket consisting of a front wall, a base wall and side walls, the outline of the front wall of the pocket corresponding to the contour of the cutout in the base wall.

In an advantageous embodiment, the front wall of the pocket has a roughly U-shaped cutout, so that the article is safely held.

This makes it possible to produce a container which corresponds in shape to a snap pack for compact cassettes.

The examples which follow, and are shown in the drawing, illustrate the invention.

Figure 1:
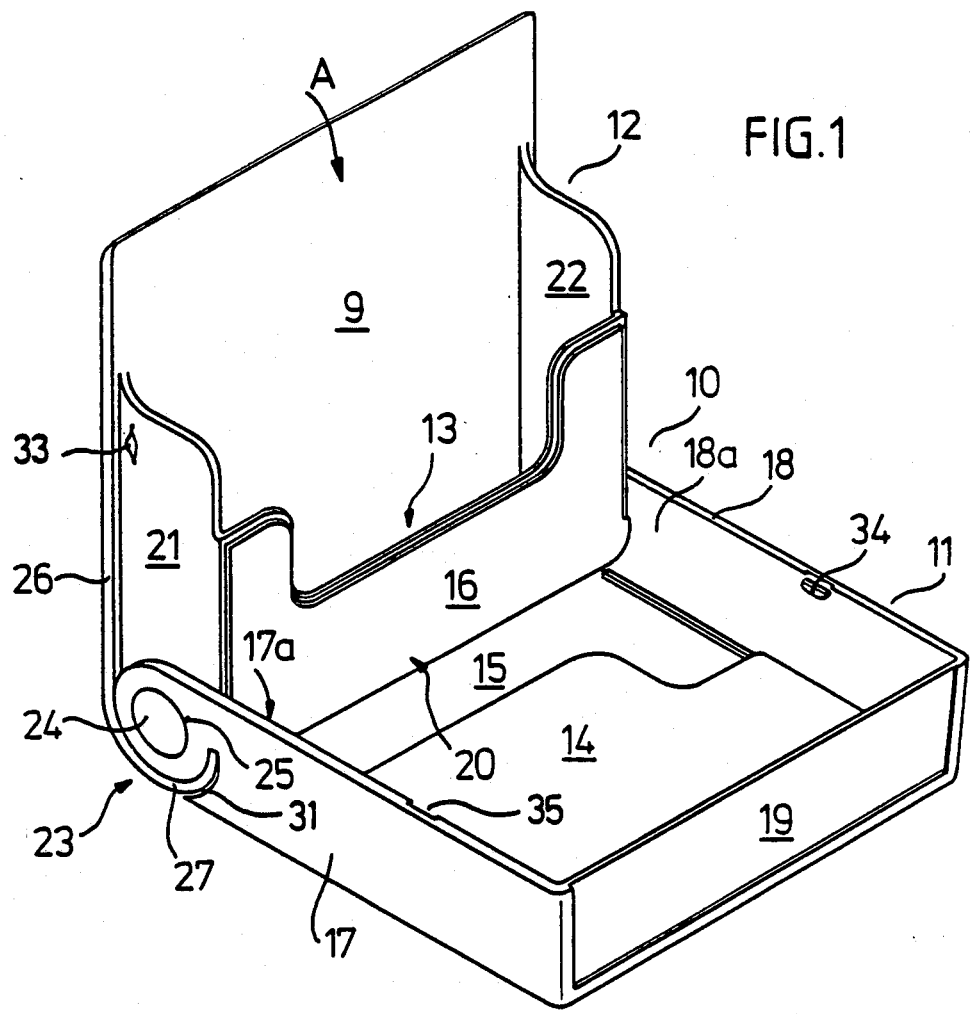
FIG. 1 shows a container according to the invention.

The snap box 10 consists of bottom part 11 and lid part 12, an open pocket 13 for holding one or more articles being provided on the inside of lid wall 9 of lid part 12, and base wall 14 being provided with a cutout 15 whose contour corresponds to the outline of the front wall 16 of pocket 13. The snap box 10 is shown with lid part 12 swung up through about 90°, which is the display position of snap box 10. When box 10 is closed, front wall 16 closes base cutout 15, and the article or articles which are present in the pocket and can be flat and, for example, rectangular or of any other outline, e.g. FlexyDisks, disks, tape reels, film reels etc., are shielded from the environment on all sides.

Bottom part 11 consists of base wall 14, side walls 17 and 18 and a frontwall 19, which is connected to all the other walls. The lid part 12 has a roughly semicylindrical base wall 20 on the pocket 13, this base wall 20 connecting with front wall 16 and side walls 21 and 22 of the pocket. Bottom part 11 and lid part 12 are pivotably connected to one another via a joint device 23. The elements of joint 23 are roughly cylindrical pegs 24 which preferably have a depression at the front end and are located on the outside of the side walls 21 and 22 of the pocket, and corresponding circular recesses on the inside of the free ends 17a and 18a of side walls 17 and 18 of bottom part 11, or circular holes 25 in the stated free ends. The depression in the front ends of pegs 24, which has roughly the shape of a spherical cap, is advantageous from the point of view of manufacture, owing to the reduction in the amount of material which accumulates as a result of cooling after manufacture. Without the edge 26 which projects over the side wall 21 of the pocket, runs into circular edge 27 and comes to rest against the upper edge of side wall 17 in the closed position, it would be possible to rotate lid part 12 until the outside of lid wall 9 came into contact with the front edge of base wall 14, i.e. an angle of rotation of about 300° from the closed position would be possible. A freely moving joint 23 would therefore permit the article or articles being stored to fall out, and would also make it impossible to open up the lid part 12 so that box 10 could be used as a display container. However, if base wall 20 of the pocket were altered to a flat wall, it would be possible to set up a display position at 90°, which could remain stable. Such a joint 23 consisting only of elements 24 and 25 can also be easily, and therefore unintentionally, separated, and each of the parts 11 and 12 could be lost. Furthermore, there is a danger that the free ends 17a and 18a of side parts 17 and 18 could break off, with the result that the container would be useless.

Figure 2:
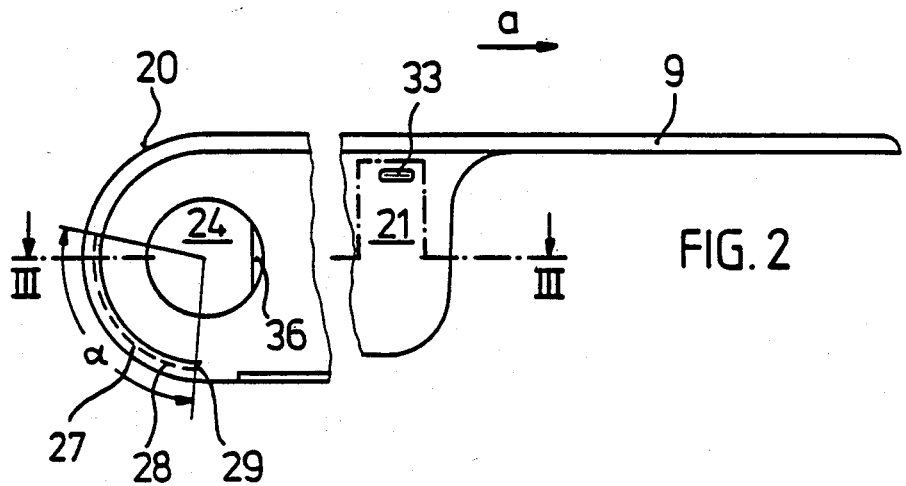
FIG. 2 shows a side view of the lid part.
Figure 3:
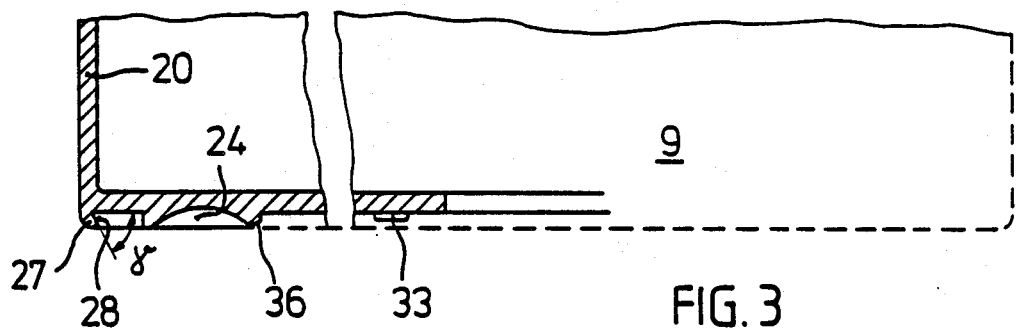
FIG. 3 shows a section through line III—III in FIG. 2.

The last-mentioned disadvantages can be prevented by means of positive interlocking of joint 23, as described below, circular edge 27 playing an important role. As shown in FIG. 2, circular edge 27 possesses a groove 28, which runs from the end 29 of the said edge 27 through an angle α of about 100°. As can be seen in FIG. 3, the groove 28 can be in the form of an undercut in the circular edge 27, i.e. a surface sloping at an appropriate angle, when viewed in cross-section. However, the groove may furthermore have a step-shaped cross-section if the counter-piece, the second interlocking part, has a complementary step shape.

Where circular edge 27, as the first interlocking part, has an undercut 28, the second interlocking part consists of a beveled edge 30 (FIG. 4) concentric with joint opening 25, the beveled edge 30 running along a concentric slot 31 in end 17a or 18a of the side wall. The arc length (β) of the beveled edge 30 corresponds roughly to the arc length (α) of the undercut 28.

In the display position of box 10 in FIG. 1, the entire arc length of the undercut 28 is in contact with the beveled edge 30, hence resulting in a position in which there is the greatest extent of positive interlocking.

If lid part 12 is swung in the direction of arrow A toward the closed position, the beveled edge 30 increasingly moves out of groove 28; when it has almost left this groove, the circular part of end 18a of the side wall can be spread laterally away from peg 24, and lid part 12 and bottom part 11 can easily be separated from one another.

It is not necessary to provide a slot 31 in the end 17a or 18a of the wall, and the shaded corner of wall end 18a could also be omitted, although this would facilitate separation of parts 11 and 12, even in the positively interlocked position of FIG. 1. If the sloping surface in the groove cross-section is replaced by a stepped surface, positive interlocking can be further increased, since in this case, with appropriate dimensions, separation can be achieved only in those positions where the groove no longer interlocks with its counterpiece. This range could be extended somewhat by means of additional sloping surfaces for facilitating the initial engagement of the interlocking parts. The possibility of separation in the case of a beveled undercut is certainly also dependent on the angle of the particular sloping surfaces (cross-sectional angle γ) and on the extent to which they match. In the example shown in FIG. 3, the angle γ is about 60°. For the material and dimensions chosen, this angle is sufficient to ensure adequate interlocking. For a firmer material and/or a thicker circular edge, an angle of about 45° may also be sufficient. The angle γ should therefore be about 45° up to just below 90°, preferably 50°–75°. When the groove 28 is manufactured as an undercut by the injection molding method, it is necessary to use for groove 28, to permit removal of lid part 11 from the mold, not only conventional slides, which are moved axially from the pegs 24, but also drag slides which form an integral part of the slides.

The slot 31, or rather its predetermined limited length, restricts rotation of the lid part 12 and bottom part 11 with respect to one another, since the end 32 of the slot acts as a stop for the end 29 of circular edge 27. In principle, the limiting angle can be selected by suitable choice of the slot length. However, to prevent box 10 from toppling over from its display position, the weight of the object or objects to be set up or displayed, as well as the weight of lid part 12 and bottom part 11 and the difference in their weights, should be taken into account in establishing the dimensions. An opening angle of about 80°–100° has proven advantageous and stable for a pack of 10 Mini-FlexyDisks (dimensions about 150×150×35 mm). If other articles, in particular longer and/or heavier ones, are to be held, it is preferable to employ dimensions which give smaller angles, the form of lid part 12 and bottom part 11 being otherwise unchanged.

Figure 5:
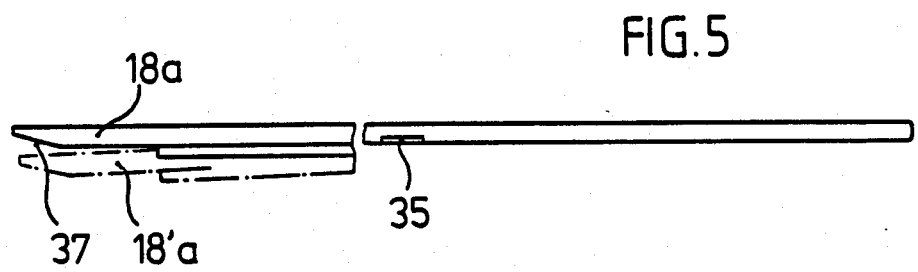
FIG. 5 shows a plan view of the side wall in the direction of arrow B in FIG. 4.

As indicated in FIG. 5, it is possible, after the plastic material, e.g. high-impact polystyrene 454 C or semi-impact-resistant polystyrene 427, has been removed from the mold and cooled, for the ends 18a and 17a of the side walls 18 and 17, respectively, of the bottom to occupy the inward-directed position shown as a broken line, so that initial tension is retained after assembly and not only damps the rotational movement of the parts but also counteracts their separation. The end 18a, shown as a solid line, corresponds to its position after assembly, while 18'a corresponds to its position before assembly. The distance between 18a and 18'a can be predetermined, and depends on the material.

In order to lock lid part 12 and bottom part 11 in the closed position, it is possible, for example, for each of the side parts 21 and 22 of the pocket to be provided with a locking stud 33 which, on closing, rests in the corresponding recess 34 which may possess beveling 35 and is located close to the upper edge of side walls 17 and 18 of the bottom. This provides greater protection against the box being unintentionally opened and the article or articles falling out. The roughly U-shaped cutout in the front wall 16 of pocket 13, and consequently the higher front wall sections toward the sides, are also advantageous in preventing the article from falling out or being tipped out when the container is in the display position.

Figure 4:
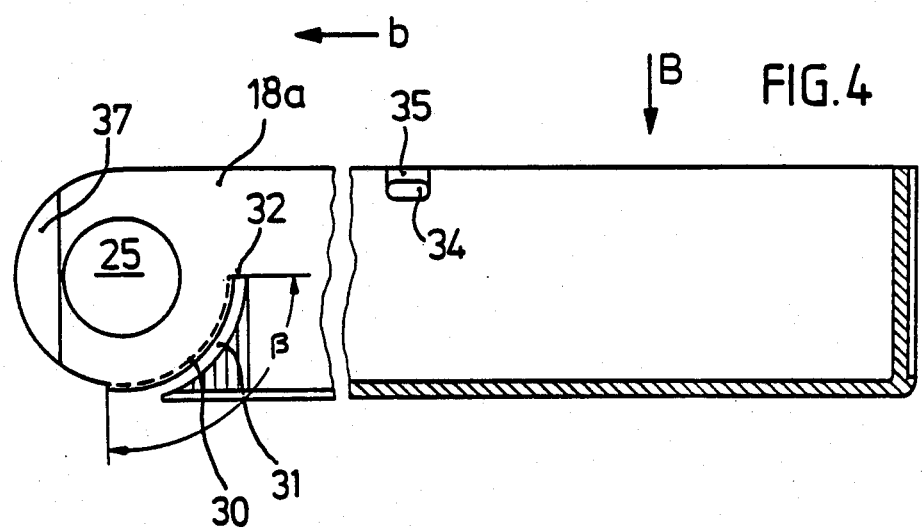
FIG. 4 shows a side view of the bottom part from inside.

Assembly of the bottom part 11 and the lid part 12 is effected by pushing these parts into each other, lid part 12 in the position shown in FIG. 2 being pushed in the direction of arrow a, and bottom part 11 in its position in FIG. 4 being pushed in the opposite direction (arrow b). In carrying out this assembly procedure, the ends 17a and 18a of the side walls are first guided over side walls 21 and 22 of the pocket and then spread over pegs 24; the final position can be reached by lateral pressure on the rings of parts 17a and 18a. In the final phase, the beveled edges 30 snap into the undercut 28, with which the bottom part 11 and lid part 12 of box 10 are assembled, and positively interlocked with one another. Sloping surfaces 36, on the outside of pegs 24, and 37, on the inside of wall ends 17a and 18a, facilitate assembly of parts 11 and 12. In principle, it is possible for the arcs extended by angles $\alpha$ and $\beta$ of the interlocking parts to be larger or smaller, or to differ, or to be arranged in a different way on circular edge 27 or on the circular parts of wall ends 17a and 18a. The arc length which is suitable in each case depends on both the flexibility of the material used and the cross-sectional angle $\gamma$ of the undercut of groove 28 or the step-shaped toothing of the groove and the counter-piece.

The invention has been described using a snap box 10 as an example. The subject of the invention can of course be applied to any type of container according to the preamble of the claim. Thus, it is quite possible for two open rectangular container parts to be connected, or connectable, with one another via a joint or interlocking device according to the invention. It is of course possible to make further modifications, for example to the closure device of the container or to the rotational restriction or to the devices for facilitating assembly, in order to achieve other embodiments of the container, which are likewise advantageous.

We claim:

1. A substantially rectangular storage container for flat articles, in particular magnetic recording media in packages, said container comprising
    two parts, namely a bottom part consisting of a base wall bordered on two sides by side walls of flexible material and a lid part consisting of a lid wall at least partly bordered at the sides by side walls, and
    a hinge device between the bottom part and the lid part to permit pivotal movement therebetween about a stationary axis,
    wherein each of the side walls of one of the container parts, on the side thereof facing the respective side wall of the other container part, has a first interlocking part, including a first part-circular edge portion extending concentrically about said axis and undercut in a direction radially outwardly from said axis to form a first part-circular groove whereas each of the side walls of the other container part, on the side thereof facing the respective side wall of the first-mentioned container part, has a second interlocking part which is substantially complementary to the first interlocking part and includes a second part-circular edge portion designed to mate with said first groove, and undercut in a direction radially inwardly from said axis to form a second part-circular groove designed to mate with said first edge portion, said interlocking parts being dimensioned so as to effectively engage each other over only a predetermined extent of said pivotal movement, whereby lateral spreading apart of said side walls of the bottom part, in a direction substantially parallel to the pivotal axis of said parts, to an extent permitting mutual axial disengagement of said parts is prevented only over said predetermined extent.

2. A container as claimed in claim 1, wherein said part-circular edge portions are undercut to form slanted grooves.

3. A container as claimed in claim 2, wherein the side walls of both said container parts have semicircular ends, said edge portions being formed near the periphery of said semicircular ends.

4. A container as claimed in claim 3, wherein a slot having substantially the same width as the part-circular edge portion of the lid part is provided in the side walls of the bottom part, adjacent and concentric to the corresponding groove.

5. A container as claimed in claim 2, wherein said edge portions and said grooves are each in the form of a roughly 100° arc.

6. A container as claimed in claim 5, wherein the 100° arc of the container parts is arranged so that the side walls of one container part can be disengaged from the other container part exclusively near the closed position of the container parts.

7. A container as claimed in claim 1, wherein the hinge device consists of a cylindrical projection at each side wall of the lid part, and a circular opening in each side wall of the bottom part.

8. A container as claimed in claim 7, wherein at least the cylindrical projections are provided with sloping surfaces to permit the side walls of the bottom part to be pushed over during assembly.

9. A container as claimed in claim 1, wherein said second interlocking part has a curved slot in the side wall of the first-mentioned container part, said slot being of limited length and said first part-circular edge portion being dimensioned to abut against the end of said slot in the extreme pivotal position of said container parts to limit the extent of their relative pivoting movement.

10. A substantially rectangular storage container for flat articles, in particular magnetic disks in evelopes or magnetic tape cassettes, said container comprising
    two parts, namely a bottom part consisting of a base wall bordered on two sides by side walls of flexible material and a lid part consisting of a lid wall at least partly bordered at the sides by side walls, the base wall of the bottom part having a cut-out which is bordered at the sides by the side walls of the bottom part, and the lid part having a pocket which consists of a front wall, a base wall and side walls, the outline of the front wall corresponding to the contour of the cut-out, and
    a hinge device between the bottom part and the lid part to permit pivotal movement therebetween about a stationary axis,
    wherein each of the side walls of one of the container parts, on the side thereof facing the respective side wall of the other container part, has a first interlocking part, including a first part-circular edge portion extending concentrically about said axis and undercut in a direction radially outwardly from said axis to form a first part-circular groove whereas each of the side walls of the other container part, on the side thereof facing the respective side wall of the first-mentioned container part, has a second interlocking part which is substantially complementary to the first interlocking part and includes a second part-circular edge portion designed to mate with said first groove, and undercut in a direction radially inwardly from said axis to form a second part-circular groove designed to mate with said first edge portion, said interlocking parts being dimensioned so as to effectively engage each other over only a predetermined extent of said pivotal movement, whereby lateral spreading apart of said side walls of the bottom part, in a direction substantially parallel to the pivotal axis of said parts, to an extent permitting mutual axial disengagement of said parts is prevented only over said predetermined extent.

11. A container as claimed in claim 10, wherein the front wall has roughly U-shaped cutout which is symmetrical about its center line, and the front wall is higher toward the side wall.

12. A container as claimed in claim 10, wherein the cross-sectional angle of the undercut in the part-circular edge portions is from 45° to 90°.

* * * * *